(No Model.)
J. S. YOUNG.
FIFTH WHEEL.
No. 493,324. Patented Mar. 14, 1893.
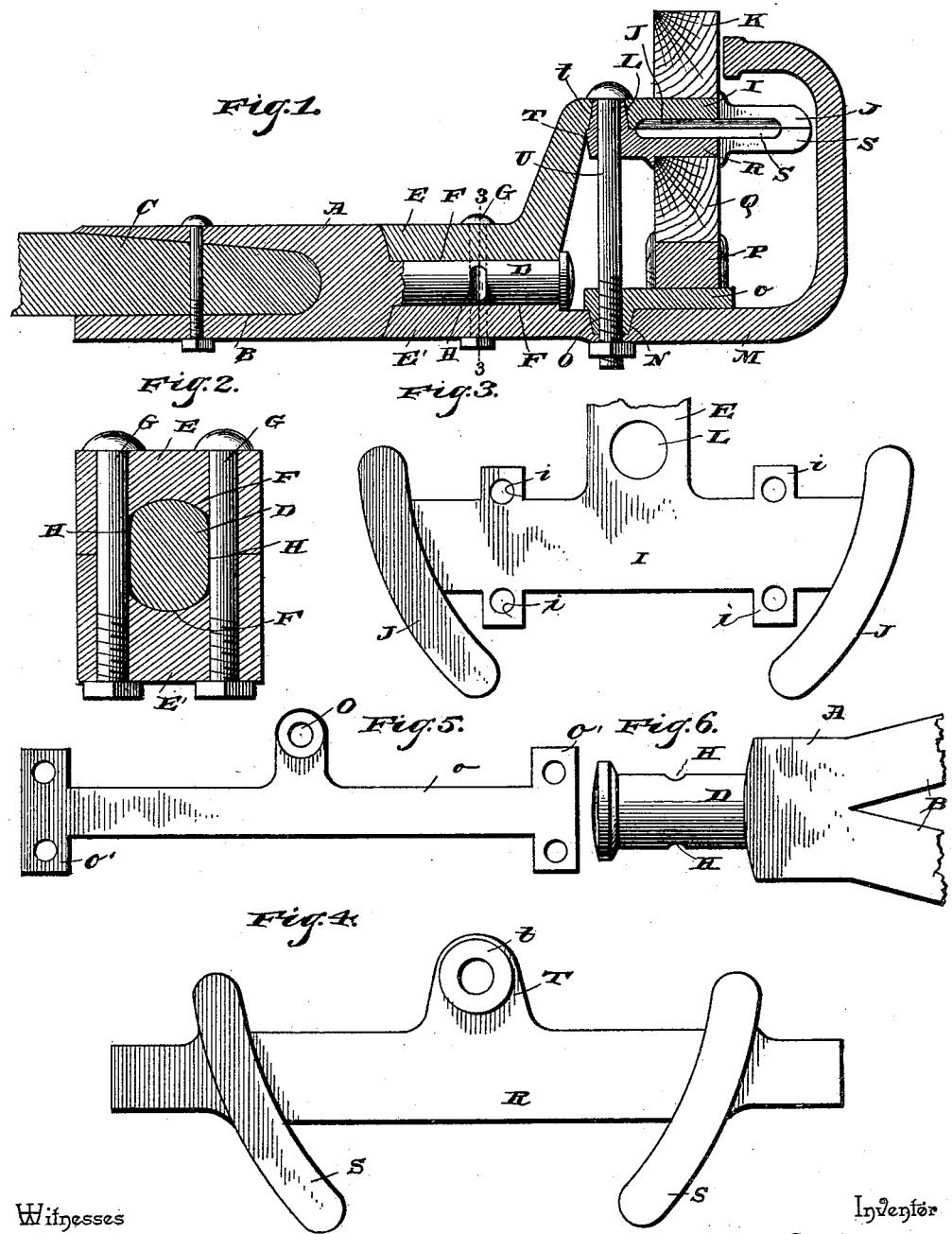

United States Patent Office.

JOHN S. YOUNG, OF DEFIANCE, OHIO.

FIFTH-WHEEL.

SPECIFICATION forming part of Letters Patent No. 493,324, dated March 14, 1893.

Application filed December 2, 1892. Serial No. 453,878. (No model.)

*To all whom it may concern:*

Be it known that I, JOHN S. YOUNG, a citizen of the United States, residing at Defiance, in the county of Defiance and State of Ohio, have invented a new and useful Fifth-Wheel, of which the following is a specification.

This invention relates to fifth wheels for vehicles; and it has for its object, to provide an improvement in devices of this character and more particularly in the reach couplings for vehicles which shall provide a construction wherein each axle of the vehicle is allowed an independent vertical movement at either end so that the reach is entirely relieved of torsional strain, thereby providing a coupling having all the essentials of strength and durability.

With these and other objects in view which will readily appear as the nature of the invention is better understood, the same consists in the novel construction, combination and arrangement of parts hereinafter described, illustrated and claimed.

In the accompanying drawings:—Figure 1 is a vertical longitudinal sectional view of a fifth wheel coupling constructed in accordance with this invention. Fig. 2 is a detail sectional view of the line 3—3 of Fig. 1. Fig. 3 is a detail bottom plan view of the upper coupling section. Figs. 4 and 5 are detail views of the lower section of the fifth wheel and the axle plate or rest respectively. Fig. 6 is a detail plan view of one end of the coupling adapted for a double reach.

Referring to the accompanying drawings:— A represents the front reach iron of the vehicle having a bifurcated end B, which is securely clamped to the front end of the reach C, extending from the rear axle of the vehicle, and said reach iron terminates at its front in a headed spindle D, to which is coupled the reach and fifth wheel coupling herein described. The coupling comprises the upper and lower sections E and E', respectively, each of which is provided at its inner end with a semi-circular combined coupling and bearing box F, which registers with the rounded spindle D, and said boxes meeting each other at their adjacent edges forming a coupling sleeve embracing said spindle, and are clamped to each other and to said spindle by means of the opposite coupling bolts G, passing through opposite sides of the boxes F, and engaging the side grooves H, in opposite sides of the spindle D. The side grooves H, while allowing a radial movement of the coupling on the spindle, at the same time limit such movement and render the coupling much more secure. The upper coupling section E, is extended at its front end into a right angularly disposed fifth wheel plate I, which carries at each end thereof the integral segmental fifth wheel bearing section J, which form with the plate I, the upper half of the fifth wheel, which as described is an integral part of the upper section of the coupling. The upper fifth wheel plate I, of the section E, is further provided with the clip lugs *i*, which provide means for securing the ordinary head block K, to the top of the coupling section E, said head block being of the ordinary construction and carrying the usual vehicle spring. The section E, is further provided directly in rear of the plate I, with the opening L, the function of which will presently appear. The lower coupling section E', is extended from its inner box into a front curved guard arm M, which is extended from the plane of the section E', entirely around the front of the coupling and fifth wheel sections, to the head block K, so as to inclose the entire exposed front portion of the fifth wheel and form a guard for the same. The section E', is provided at a point adjacent to its inner end thereof and at its inner face with the bearing socket N, which receives the perforated bearing stud O, of the axle plate or rest *o*. The axle plate or rest *o*, rests flat upon the bottom of the front axle P, and is provided at each end with the perforated heads *o'*, by means of which the same can be suitably clipped to the axle, and by this construction it will be seen that the plate or rest takes the wear of the axle off of the lower coupling section and also provides for the easy movement of the fifth wheel.

Arranged upon the axle P, is the stock Q, which carries the lower fifth wheel plate R, having near each end thereof the integral segmental bearing sections S, corresponding to the upper fifth wheel bearing section J and adapted to contact therewith and work thereunder. The lower fifth wheel plate R, is further provided with a central off-standing arm T, having a perforated bearing stud *t*, taking into the opening L, of the coupling section E, and accommodating the king-bolt U, passing through the opening L, of the coupling section E, the bearing stud of the axle plate or rest, and the lower coupling section E', to provide for coupling the fifth wheel sections together and to the axle.

From the foregoing it will be readily seen that the reach coupling not only provides for relieving the reach of torsional strain and allowing the axles independent movement, but at the same time provide an improved fifth wheel construction to secure the necessary pivot of the front axle of the vehicle.

By reference to Fig. 6 of the drawings, it will be seen that in the event of a double reach extending to the front of the vehicle, I may slightly modify the fifth-wheel coupling so that two bifurcated ends B, are extended from the spindle D, as will be readily apparent, and it will of course be understood that changes in the form, proportion and the minor details of construction may be resorted to without departing from the principle or sacrificing any of the advantages of this invention.

Having thus described my invention, what I claim, and desire to secure by Letters Patent, is—

1. The combination with a vehicle reach; of the reach iron secured to the front end of the reach and having a spindle, a sectional coupling comprising upper and lower sections each clamped at its inner end to the opposite section and said spindle and extended at their front ends, and the front axle and fifth wheel arranged between the extended ends of said section, substantially as set forth.

2. The combination of a vehicle reach iron, having a rounded spindle at its front end provided with opposite side grooves, a sectional coupling comprising upper and lower sections, having boxes at their inner ends registering with said spindle, clamping bolts connecting said boxes and engaging the opposite side grooves of said spindle, and the front axle and fifth wheel arranged between said sections, substantially as set forth.

3. In a vehicle, the combination of the front reach iron having a spindle, a sectional coupling clamped loosely at its inner end to said spindle, and the upper section of which is provided with an integral upper fifth wheel section, the front axle arranged upon the lower coupling section, and the lower fifth wheel section mounted upon said axle, substantially as set forth.

4. The combination of the vehicle reach iron having a spindle at its front end, a divided or sectional coupling clamped loosely at its inner end to said spindle, and the upper section of which is provided with an integral right-angularly disposed upper fifth wheel plate at its front end having integral segmental bearing sections and supporting the head block, and the lower section of which is extended into a front curved guard arm reaching to the head block, and is provided with a bearing socket, an axle plate or rest having a perforated bearing stud taking into said socket, the front axle mounted on said plate or rest, the lower fifth wheel section having opposite segmental bearing sections contacting with the integral bearing sections of the upper coupling section, and an intermediate bearing arm, and a king-bolt, connecting the upper and lower coupling sections and passing through said bearing arm and stud, substantially as set forth.

In testimony that I claim the foregoing as my own I have hereto affixed my signature in the presence of two witnesses.

JOHN S. YOUNG.

Witnesses:
   J. J. REYNOLDS,
   D. E. DOZER.